(12) United States Patent
Togawa

(10) Patent No.: US 8,700,851 B2
(45) Date of Patent: Apr. 15, 2014

(54) APPARATUS AND METHOD FOR INFORMATION PROCESSING ENABLING FAST ACCESS TO PROGRAM

(75) Inventor: Atsushi Togawa, Tokyo (JP)

(73) Assignees: Sony Corporation, Tokyo (JP); Sony Computer Entertainment Inc., Tokyo (JP)

(*) Notice: Subject to any disclaimer, the term of this patent is extended or adjusted under 35 U.S.C. 154(b) by 1045 days.

(21) Appl. No.: 12/051,287

(22) Filed: Mar. 19, 2008

(65) Prior Publication Data

US 2008/0235460 A1  Sep. 25, 2008

(30) Foreign Application Priority Data

Mar. 22, 2007 (JP) ................................ 2007-075630

(51) Int. Cl.
- *G06F 12/00* (2006.01)
- *G06F 13/00* (2006.01)
- *G06F 13/28* (2006.01)
- *G06F 12/08* (2006.01)

(52) U.S. Cl.
CPC ........ *G06F 12/0802* (2013.01); *G06F 12/0866* (2013.01); *G06F 12/0862* (2013.01)
USPC ........................................................ 711/118

(58) Field of Classification Search
USPC ........................................................ 711/118
See application file for complete search history.

(56) References Cited

U.S. PATENT DOCUMENTS

| | | | | |
|---|---|---|---|---|
| 4,951,193 A | * | 8/1990 | Muramatsu et al. | 711/206 |
| 5,761,716 A | * | 6/1998 | Byrn et al. | 711/133 |
| 6,098,152 A | * | 8/2000 | Mounes-Toussi | 711/134 |
| 6,301,641 B1 | * | 10/2001 | Verhoeven et al. | 711/118 |
| 6,647,491 B2 | * | 11/2003 | Hsu et al. | 712/237 |
| 2004/0193801 A1 | * | 9/2004 | Benhase et al. | 711/118 |
| 2004/0267706 A1 | * | 12/2004 | Springer et al. | 707/3 |
| 2006/0004957 A1 | * | 1/2006 | Hand et al. | 711/113 |
| 2007/0089106 A1 | * | 4/2007 | Lobo et al. | 717/162 |
| 2007/0204107 A1 | * | 8/2007 | Greenfield et al. | 711/128 |

* cited by examiner

*Primary Examiner* — Matthew Bradley
*Assistant Examiner* — Craig Goldschmidt
(74) *Attorney, Agent, or Firm* — Matthew B. Dernier, Esq.; Gibson & Dernier LLP

(57) ABSTRACT

A main memory stores cache blocks obtained by dividing a program. At a position in a cache block where a branch to another cache block is provided, an instruction is embedded for activating a branch resolution routine for performing processing, such as loading of a cache block of the branch target. A program is loaded into a local memory in units of cache blocks, and the cache blocks are serially stored in first through nth banks, which are sections provided in the storage area. Management of addresses in the local memory or processing for discarding a copy of a cache block is performed with reference to an address translation table, an inter-bank reference table, and a generation number table.

8 Claims, 12 Drawing Sheets

APPARATUS AND METHOD FOR INFORMATION PROCESSING ENABLING FAST ACCESS TO PROGRAM

BACKGROUND OF THE INVENTION

1. Field of the Invention

The present invention relates to an information processing technique, and particularly to an information processor that is provided with a memory having a hierarchical structure, and an information processing method applicable to the information processor.

2. Description of the Related Art

Due to the advancement of information processing techniques of recent years, a wide variety of functions can be easily implemented on an information processor by activating, for example, software recorded in CD-ROMs or other recording media or software downloaded from a network server. Under such circumstances, efficient and high-speed processing of programs has continued to be an important issue.

To enable high-speed processing, there needs to be not only an improvement in performance of processors but also an improvement in the data transfer rate between units in an information processor, such as between processor units or between a processor unit and a memory. One technique for enabling a processor's fast access to data or to a program stored in a memory is to hierarchize the memory using a cache memory. Generally, a cache memory has a capacity smaller than that of a main memory and enables fast data access. By storing frequently accessed data in a cache memory, the number of accesses to the main memory can be decreased, thereby reducing the overall time required for data access. Also, in a multiprocessor system comprising multiple processors, local memories provided in the respective processors enable fast access to a greater amount of data.

In order for a processor to process a program faster, the processor also needs to access the machine code faster. However, since a memory for enabling fast access, i.e., a high-speed memory, generally has a small capacity, programs often cannot be stored entirely therein, depending on the size of the program. In such case, a programmer needs to manually divide the program into multiple modules and also devise a way for loading such modules from the main memory into the high-speed memory at appropriate times.

SUMMARY OF THE INVENTION

The present invention has been made in view of such a problem, and a general purpose thereof is to provide a technique for enabling fast and efficient access to a program.

One aspect of the present invention relates to an information processor. The information processor comprises: a main memory that stores a plurality of cache blocks having connections according to an instruction reference order in which the cache blocks are referred to; a local memory that stores at least one of the plurality of cache blocks as copies thereinto; and a processor that performs processing by sequentially executing instructions contained in the cache blocks copied into the local memory according to the instruction reference order and where newly copied cache blocks from the main memory into the local memory if necessary. An area for storing the copied cache blocks in the local memory comprises a plurality of memory banks, and, when there is not enough free space within the local memory into which a cache block is newly copied, the processor discards the cache blocks copied previously in units of the memory to ensure free space. The processor stores in the local memory, with respect to each of the data blocks copied, reference destination information of the newly copied cache block to which each of the cache blocks may refer afterwards.

In the above, "having connections according to an instruction reference order" means that the cache blocks have connections between each other in terms of the order in which the cache block is accessed according to an instruction set, such as when a cache block is either fully or partially referred to in an instruction, and afterwards, subsequent cache blocks are referred to. The above also includes, for example, the case where two cache blocks are positioned consecutively in the instruction reference order, the case where the reference destination returns or does not return to the original cache block that had been called in an instruction, and the case where three or more cache blocks have connections between each other. Since the relationships between cache blocks are not restricted, both the case where a cache block is referred to in order that another cache block is referred to, and the case where cache blocks have no correlation but there is an order in which the data blocks are to be referred to are included in the above. Also, a "cache block" may contain program data, numerical data, image data, or audio data, or data obtained by dividing such data according to a given rule, or a combination of such data.

Another aspect of the present invention relates to an information processing method. The information processing method comprises: storing, in a local memory, program data of a branch source in which a branch instruction specifying an address in the local memory is described, and program data of a branch target, which contains the address specified by the branch instruction; relating information regarding the address of the storage area of the program data containing the branch source in the local memory to the program data containing the branch target so as to store the information; and identifying, when the program data of the branch target is discarded, the program data of the branch source on the basis of the information on the storage area of the program data of the branch source in the local memory, and invalidating the address specified by a branch instruction described in the program data of the branch source.

Optional combinations of the aforementioned constituting elements, and implementations of the invention in the form of methods, apparatuses, systems and computer programs may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
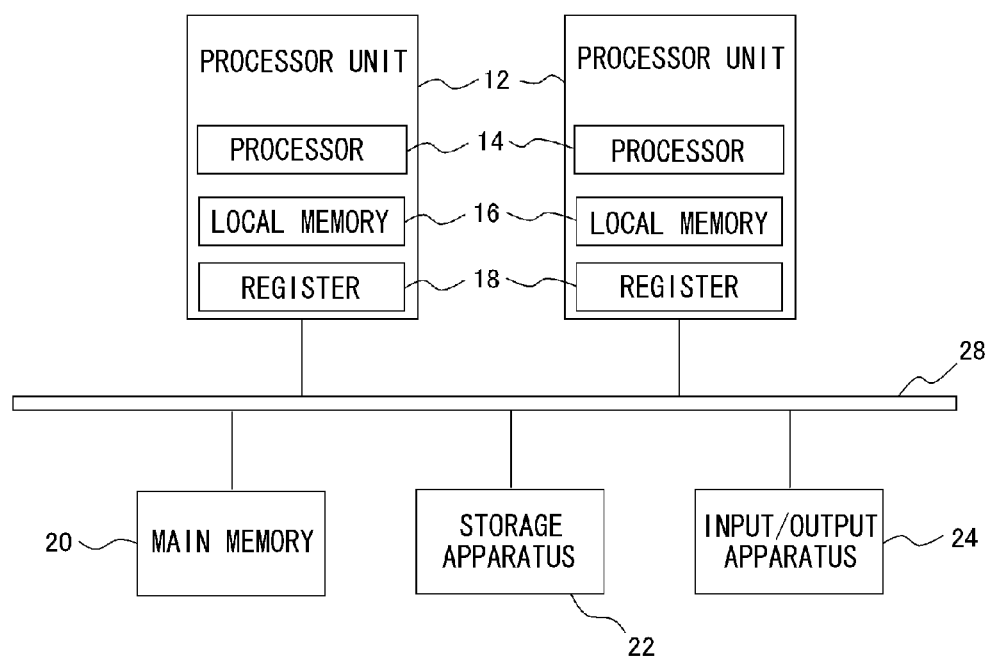
FIG. 1 is a diagram that shows the configuration of an information processor according to an embodiment.

FIG. 1 shows the configuration of an information processing apparatus according to an embodiment. An information processing apparatus 10 comprises: a processor unit 12, which includes a processor 14, a local memory 16, and a register 18; a main memory 20; a storage apparatus 22; and an input/output apparatus 24. The aforementioned components perform data transmission between one another via a bus 28. The processor unit 12 may enable DMA (Direct Memory Access) in an MFC (Memory Flow Controller) to which the unit connects in order to perform data transmission, but the illustration therefor is omitted in FIG. 1.

Although two processor units 12 are illustrated in FIG. 1, the number of the processor units 12 is not limited to two and may be one or more. Also, each of the processors 14 may perform the same type of function to accomplish an overall task using multiple processes or threads in parallel, or there may be included a specialized dedicated function performed by a processor such as a graphic processor or an I/O processor.

The processor 14 in the processor unit 12 executes a program including application software activated by a user. The local memory 16 is configured, for example, with an SRAM (Static Random Access Memory) capable of high-speed access and arranged together with the processor 14 on the same chip or arranged near the processor 14. In the local memory 16 is stored part of an application program loaded into the main memory 20, including, as needed, data necessary for processing or data as the result of processing. The register 18 may be a common register that temporarily retains a value necessary for processing in the processor 14. In the present embodiment, the register 18 also stores data or stacks for managing programs stored in the local memory 16.

The main memory 20 is configured, for example, with a DRAM (Dynamic Random Access Memory) and stores the entirety of a program including an application activated by a user. The main memory 20 may also function as a shared memory for exchanging data between multiple processor units 12, or function as a system memory for the operation of an OS. The storage apparatus 22 may be a common storage apparatus, such as a hard disk, or recording media such as a CDROM and a drive therefor, or may be a combination of such apparatuses. The storage apparatus 22 stores application programs, data necessary for processing, and data to be saved during or at the end of processing. The input/output apparatus 24 inputs a user's instruction to the information processing apparatus, such as a request for activation of an application, or outputs the result of a process. The input/output apparatus 24 may be configured with an input apparatus such as a keyboard, a controller, or a pointing device, and an output apparatus such as a display apparatus, a speaker, or a printer, or may be configured with a combination thereof.

In the present embodiment, a program stored in the storage apparatus 22 is initially loaded into the main memory 20, and part of the program is then loaded therefrom into the local memory 16 according to the process performed by each processor unit 12. Accordingly, the processor 14 need not re-access the main memory 20 each time the program advances, and any access to be performed can be limited to within the processor unit 12 to its full extent, thereby enabling high-speed software processing. Conventionally, it has been necessary in such a case to divide the program into modules, each having a size that is capable of being stored in local memory 16, and to design, during the programming phase, a manager program that will load such modules into the local memory 16 in the proper sequence.

Accordingly, the efficiency of such a process becomes desirable, particularly when creating or debugging a large and complicated program for providing advanced functions, such as with game software or simulation software. In consideration thereof, the present embodiment provides a compiler for caching an instruction automatically. Accordingly, programmers need not be concerned with how modules will be loaded into local memory 16, and this advantage simplifies the implementation of an application. More specifically, when a program runs to an instruction that references a location that is not found in the local memory 16, the runtime routine of the compiler automatically performs the following processes:

(1) predicting unnecessary instructions to delete from the local memory 16 so as to create additional free space; and (2) loading necessary instructions from the main memory 20 into the local memory 16 to continue application processing.

Figure 2:
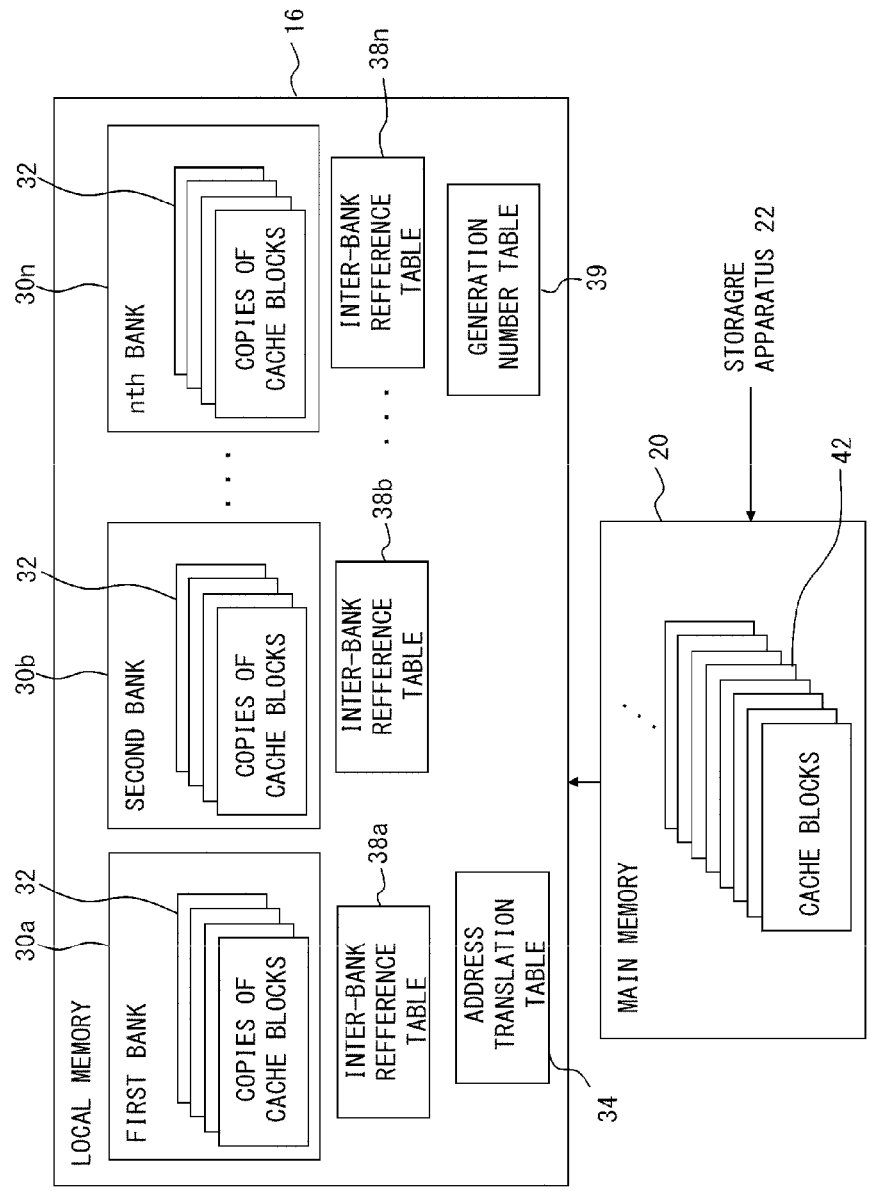
FIG. 2 is a diagram that schematically shows the structure of data stored in a local memory and a main memory in the embodiment.

FIG. 2 schematically shows the structure of data stored in the local memory 16 and the main memory 20. A program compiled by the complier of the present embodiment is loaded from the storage apparatus 22 into the main memory. When compiling a program, the compiler of the present embodiment divides the program according to certain rules so as to create program blocks. A compiled program is loaded from the main memory 20 into the local memory 16 in structured units of such blocks. The maximum data size for each of the blocks is restricted by the capacity of the local memory 16. Hereinafter, the blocks will be referred to individually as a cache block 42. Consequently, the entire set of programs, which make up a compiled application, comprises multiple cache blocks stored in the main memory 20, as shown in FIG. 2.

A program constituting one cache block 42 may be provided, for example, by dividing a sequential program at natural divisible positions so as to be of a size within a certain range, or by setting, according to empirical rules in advance such as identifying a group of functions that are referred to in an intensive manner and then collecting such functions from the original program when the latter is compiled. Alternatively, cache blocks 42 may be provided by first dividing a program into basic blocks, which are in larger units than functions, and then reforming the blocks in consideration of size or processing content. The basic block may be provided by combining functions, which are the smallest divisible components, or the like according to processing content, etc. Although it is desirable in any case that the compiler automatically creates cache blocks, a programmer may manually specify the range of cache blocks by calling functions or by dividing positions set in advance so as to reflect the programmer's preferences.

As stated previously, at least one cache block 42 is loaded from the main memory 20 to be stored in local memory 16, that is, a copy of one or more cache blocks, herein referred to individually as a cache block copy 32 of a cache block stored in local memory 16. Since a cache block copy 32 exists as a part of a program, there may be a need to reference to a cache block copy 32 during processing to branch to an instruction or to call a function in a cache block copy 32 of another cache block. If a cache block copy containing the branch target does not exist in the local memory 16 in such case, the corresponding cache block 42 in the main memory 20 is identified and copied into the local memory 16 through a run-time routine provided by the compiler. The routine for performing such a process is referred to as a branch resolution routine. The specific procedure of the branch resolution routine will be described later.

The local memory 16 is provided with n storage areas defined as a first bank 30a, a second bank 30b, . . . , and an nth bank 30n. Cache block copies 32 of cache blocks loaded from the main memory 20 are serially stored in the storage areas starting with the start address of the first bank 30a. As serial storing proceeds and all of the bank space is filled, i.e., the nth bank, which is the last bank, does not have enough space left to store a cache block copy 32, all of the cache block copies 32 stored in the first bank are discarded (hereinafter, called a bank "invalidation" process), leaving the first bank empty and available for storing new cache block copies 32. Thereafter, the second through nth banks 30b-30n are sequentially invalidated and reused as free space.

In addition to storing cache block copies 32, the local memory 16 also stores an address translation table 34, an inter-bank reference table 38, and a generation number table 39, as shown in FIG. 2. The address translation table 34 relates an address in the main memory 20 where a cache block 42 is stored to an address in the local memory 16 where a copy of the cache block is stored; the table is referred to when the processor 14 identifies the address of a cache block copy 32, which contains a branch target, in the local memory 16 in order to refer to the copy or referred to when the processor 14 determines whether or not a cache block copy 32 that is deemed necessary exists within the local memory 16.

An inter-bank reference table 38 is provided in local memory 16 for each of the first bank 30a, second bank 30b, . . . , and the nth bank 30n. As an example, using the inter-bank reference table 38, when a cache block copy 32 stored in a bank, the nth bank 30n for example, provides a branch to a cache block copy 32 stored in another bank, e.g., the second bank 30b, the inter-bank reference table 38 stores the position of the branch instruction sequence described in the cache block copy 32 providing the branch. The generation number table 39 retains a number, called a generation number, with respect to each bank, and the generation number for a respective bank is incremented each time the bank is invalidated. By referring to an inter-bank reference table 38 and the generation number table 39, a bank storing a cache block copy 32 that contains a branch target that has been invalidated can be located, for example, so that the address in the local memory 16 that has been used for the branch target becomes invalid.

Figure 3:
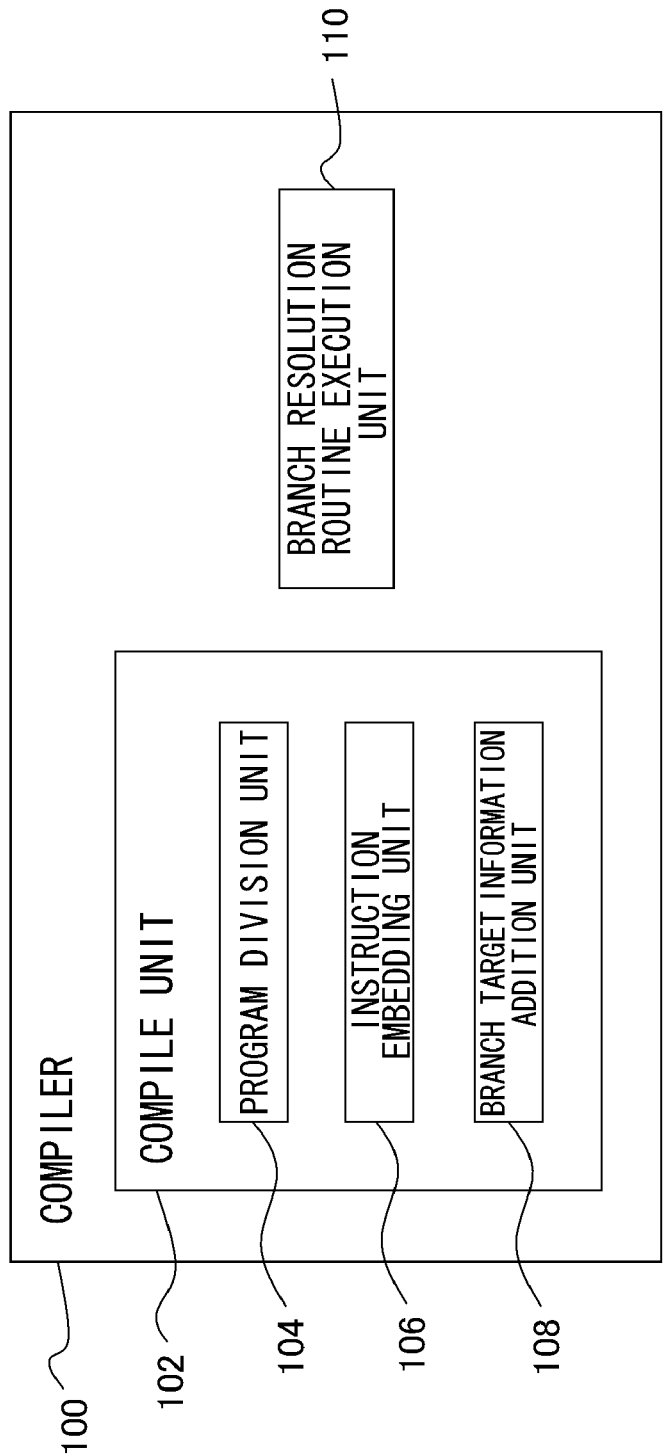
FIG. 3 is a diagram that shows the configuration of a compiler for creating a cache block and executing a branch resolution routine in the embodiment.

FIG. 3 shows the configuration of a compiler for creating a cache block to be loaded into the main memory 20 and for executing a branch resolution routine. The original application programming starts as a set of standard instruction language modules that are capable of running on a processor. To take advantage of the benefit of the present embodiment, these modules are transformed into cache blocks by a compiler comprising elements represented by functional blocks for performing various processes, shown in FIG. 3, that can be implemented by a CPU, a memory, an LSI or the like in terms of hardware, and by a program or the like in terms of software. Accordingly, it will be obvious to those skilled in the art that these functional blocks may be implemented in a variety of forms by hardware only, software only, or a combination thereof, and the form is not limited to any of them. For example, a compiler 100 may be configured with part of the information processing apparatus 10 into which the corresponding software is loaded.

The compiler 100 comprises a compile unit 102 for creating cache blocks 42 from a program, and a run-time branch resolution routine execution unit 110 for executing a branch resolution routine. The compile unit 102 includes: a program division unit 104 for dividing a program according to a certain rule as set forth previously; an instruction embedding unit 106 for embedding an instruction into a program for activating a branch resolution routine, etc., for the case where the process branches to another cache block 42; and a branch target information addition unit 108 for adding to a program's cache block providing information on a cache block 42 containing the branch target, which is necessary for the execution of a branch resolution routine in each branch process. The information added by the branch target information addition unit 108 will be described later.

The branch resolution routine execution unit 110 executes a branch resolution routine, which is activated by an instruction embedded in the program by the instruction embedding unit 106. The branch resolution routine execution unit 110 may be substantially contained in each processor 14, as the unit operates within the information processing apparatus 10 during the execution of an activated program.

Figure 4:
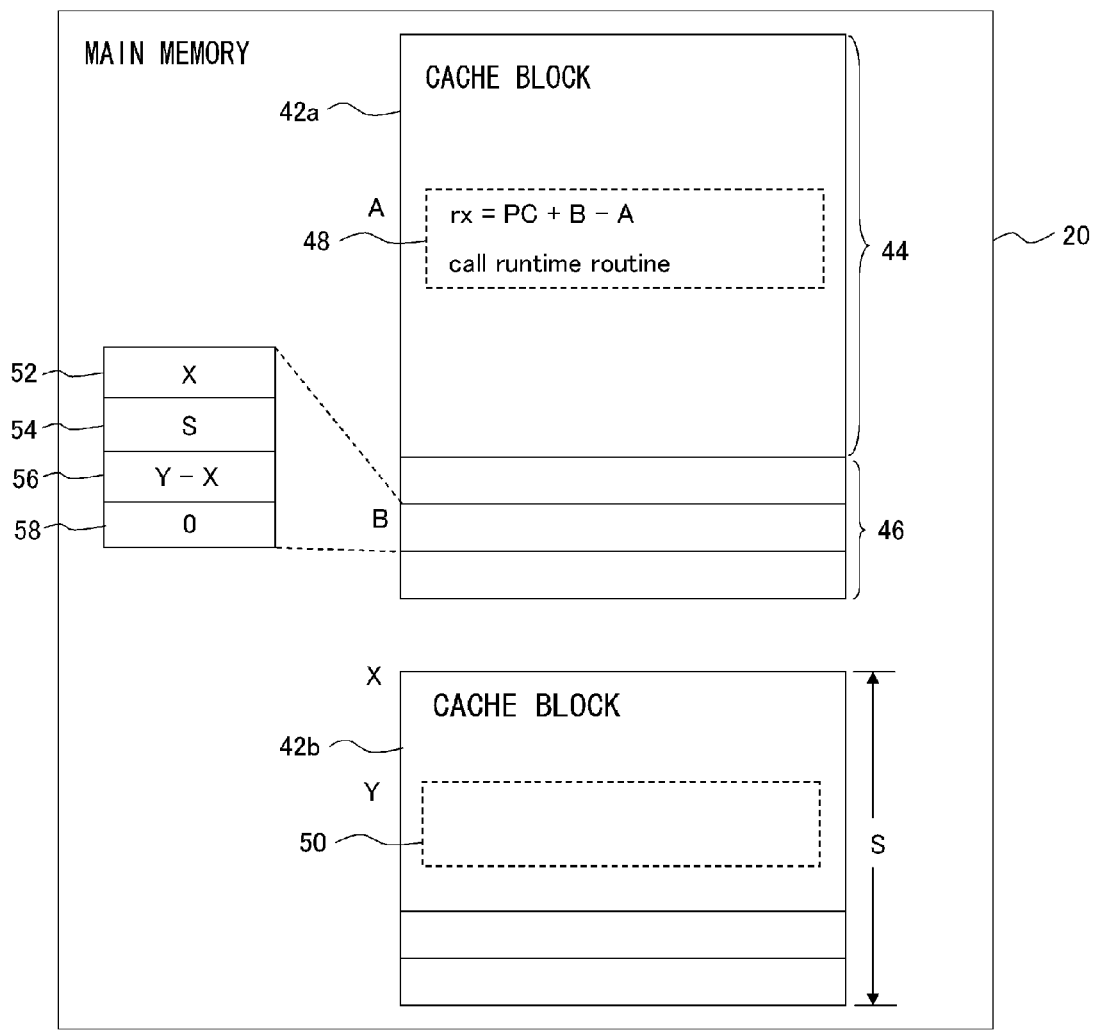
FIG. 4 is a diagram that schematically shows the structure of two cache blocks stored in the main memory in the embodiment.

In the following, the configurations of the cache blocks 42, address translation table 34, inter-bank reference table 38, and generation number table 39 shown in FIG. 2 will be described in detail. FIG. 4 schematically shows the structure of two cache blocks 42a and 42b stored in the main memory 20. It is assumed here that processing in the cache block 42a branches to processing in the cache block 42b.

The cache block 42a created by the compiler 100 consists of: a program body 44 obtained through the division of a program by the program division unit 104; and a branch target table 46, which stores information added by the branch target information addition unit 108 of the compiler 100. This configuration is the same in each cache block 42. If a program described in the program body 44 includes a branch to another cache block 42, the information on the branch will be stored in the branch target table 46, with one entry provided for each branch, respectively.

Each entry in the branch target table 46 includes a branch target cache block address field 52, a branch target cache block size field 54, a branch target instruction offset field 56, and a branch type field 58. A branch target cache block address field 52 contains the starting address of the cache block 42b in the main memory 20, which stores an instruction that contains the branch target, and a branch target cache block size field 54 contains the data size of the cache block 42b. In the example of FIG. 4, "X" is provided in the branch target cache block address field 52, and "S" is provided in the branch target cache block size field 54. Hereinafter, an address in the main memory 20 may be referred to as a "main address" while an address in the local memory 16 may be referred to as a "local address", so as to distinguish between the two.

A branch target instruction offset field 56 contains an offset value measured from the starting lowest main address of the cache block 42b to the main address at which the branch target instruction is described. In the example of FIG. 4, the branch target instruction is at the position indicated with a dotted line 50 at a main address "Y", and the offset value is calculated as "Y-X". A branch type field 58 contains information for identifying the type of a branch, providing whether the branch is a simple branch or a function call that may subsequently return control back to the branch source. In the example of FIG. 4, "0" and "1" represent the information for identifying the type of branch, and "0" is provided in the field.

As stated previously, when a cache block 42a includes in its program body 44 a branch instruction to another cache block 42b, the instruction embedding unit 106 of the compiler 100 creates an instruction sequence 48 for performing the branch process in the local memory 16 and embeds the instruction sequence in the program body 44. The instruction sequence 48 includes a first instruction sequence for storing, in the register, an address in the local memory 16, i.e., a local address at which an entry of the branch target table 46 providing the corresponding branch is described, and also includes a second instruction sequence for activating a branch resolution routine mentioned previously. In FIG. 4, the first sequence is designated as "rx=PC+B−A", and the second sequence is designated as "call runtime routine".

In the first sequence above, "rx" represents an address value in the register and "PC" represents a local address of the instruction sequence 48 at the time when the cache block 42a is copied into the local memory 16. The address in the local memory 16 at which the corresponding entry in the branch target table 46 is provided can be obtained by adding to "PC" the local address of the instruction sequence 48, which is the offset value from "A" to "B", i.e., "B-A", in which "A" represents the main address of the created instruction sequence, and "B" represents the main address of the entry.

The embedded instruction sequence 48 may also include an instruction for performing processing in the case where the process returns from a function call but a cache block copy 32 of the return destination has been discarded in the local memory 16. This process will be described later.

If a cache block 42 is formed with a group of functions included in the original program, or a group of basic blocks provided by dividing the original program, as set forth previously, there can be a case where the branch source and the branch target are both included in the same cache block 42. In such case, the branch target information addition unit 108 need not provide an entry for the branch in the branch target table 46. Also, the instruction embedding unit 106 embeds, as the instruction sequence 48, an instruction providing a simple branch to the local address of the branch target rather than an instruction sequence for storing in the register the local address of the branch target table 46 or an instruction sequence for activating a branch resolution routine. This can be implemented, for example, with an instruction causing a branch to an address provided by adding "PC", the local address of the instruction sequence 48, to the offset value of the main address of the branch target.

Figure 5:
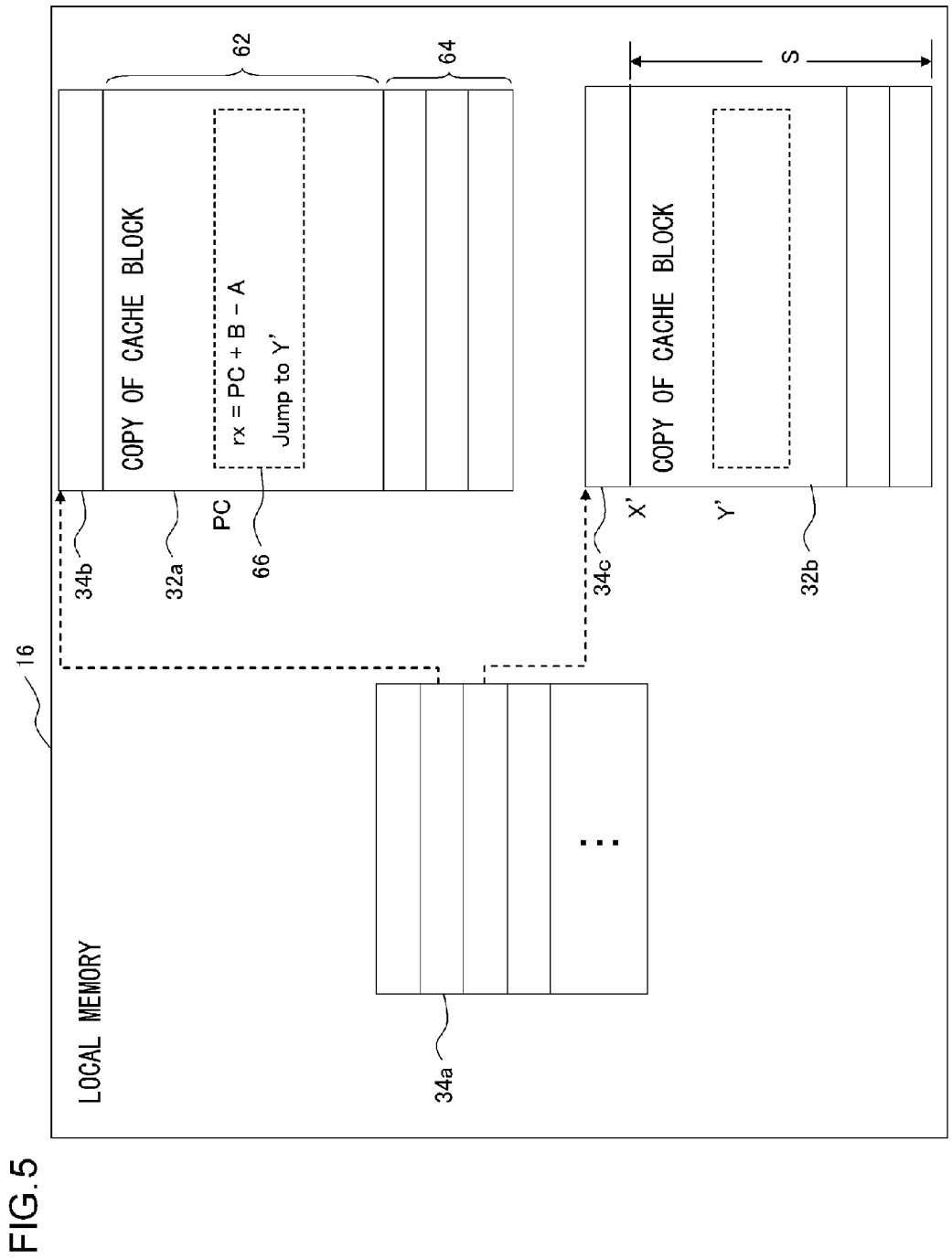
FIG. 5 is a diagram that schematically shows the structure of copies of two cache blocks and an address translation table stored in the local memory in the embodiment.

FIG. 5 schematically shows the structure of respective cache block copies 32a and 32b, provided in the local memory 16, of the two cache blocks 42a and 42b in the main memory 20 shown in FIG. 4, and the address translation table 34. The address translation table 34 consists of an address translation table header portion 34a and address translation table entry portions 34b and 34c. As will be described later, when cache blocks 42a and 42b are loaded from the main memory 20 into the local memory 16, areas for storing cache block copies 32a and 32b are ensured before the address translation table entry portions 34b and 34c are respectively written into the starting areas therein, and the cache block copies 32a and 32b are then stored in the subsequent areas, respectively.

The address translation table 34 of the present embodiment is structured as a hash table so that, based on the addresses of cache blocks 42a and 42b in the main memory 20, the local addresses of cache block copies 32a and 32b can be efficiently referenced. Accordingly, the address translation table header portion 34a now holds pointers to the address translation table entry portions 34b and 34c now attached as headers to respective cache block copies 32a and 32b of the desired cache blocks, using addresses in the main memory as an index. The address translation table 34 in such an example will be described in detail with reference to FIG. 6. The address translation table 34 may be of any structure other than a hash table as long as an address in the local memory 16 can be identified from an address in the main memory 20 by means of the table.

A cache block copy 32a also includes a program body 62 and a branch target table 64, and data to be retained therein is similar to that in a cache block 42a in the main memory 20. However, when the loading of the cache block 42b containing the branch target is completed and the storage area for the cache block copy 32b is determined in the local memory 16, the branch resolution routine replaces the instruction sequence 48, which has called the routine itself, with a branch instruction sequence 66 that provides a branch to the branch target instruction. In FIG. 5, "Y'" is the address at which the branch target instruction is described in the cache block copy 32b containing the branch target, and the corresponding instruction in the instruction sequence 66 described in the cache block copy 32a containing the branch source is replaced with the instruction "Jump to Y'". Consequently, when the process reaches the same branch instruction thereafter, a branch to the appropriate address can be provided without involvement of the branch resolution routine.

Figure 6:
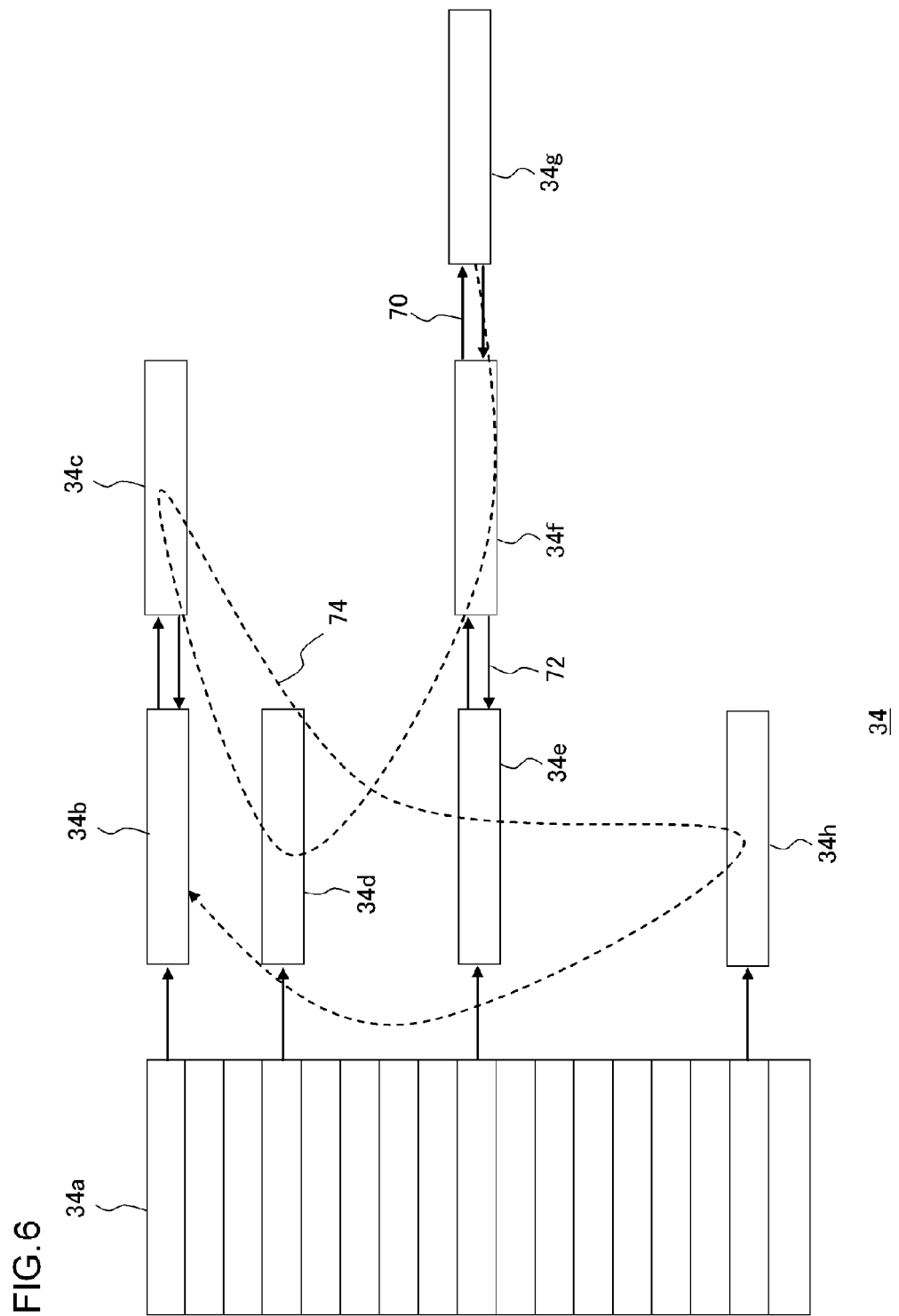
FIG. 6 is a diagram that schematically shows the structure of the address translation table in the embodiment.

FIG. 6 schematically shows the structure of the address translation table 34. As stated previously, the address translation table 34 includes the address translation table header portion 34a and address translation table entry portions 34b-34h. When a branch resolution routine is executed and a cache block 42 is newly loaded into the local memory 16, the address translation table 34 is updated while the storage area for the cache block is ensured. The address translation table 34 is updated also when a loaded cache block copy 32 is discarded.

The address translation table header portion 34a includes address fields, each of which is provided with respect to, for example, every some low-order bits of an address in the storage area for a cache block 42 in the main memory 20. When a cache block 42 is in the main memory 20 at an address corresponding to one of the address fields is loaded into the local memory 16, the local address of the created address translation table entry portion 34, an entry portion 34b for example, is written into the corresponding field in the address translation table header portion 34a.

Since each field in the address translation table header portion 34a corresponds to only part of an address in the main memory 20, there can be a case where multiple cache blocks 42 stored at different full addresses in the main memory 20 are loaded that correspond to the same partial address field in the address translation table header portion 34a, such as the address translation table entry portions 34b and 34c, as illustrated in FIG. 6. Accordingly, each of the address translation table entry portions 34b-34h stores, besides the full address of the respective corresponding cache blocks 42 in the main memory 20, a pointer to the local address of another address translation table entry portion, as indicated by solid-line arrows 70 and 72 and a dotted-line arrow 74 in FIG. 6.

More specifically, the address translation table entry portion 34f retains: the full address of the cache block 42 in main memory 20 corresponding to the portion 34f itself; the local address of the address translation table entry portion 34g connected posterior to the portion 34f in relation to the address translation table header portion 34a, as indicated by the solid-line arrow 70; the local address of the address translation table entry portion 34e connected anterior to the portion 34f, as indicated by the solid-line arrow 72; and the dotted-line arrow 74 indicates the loading order of the cache block copies 34 in chronological order by the local address of the address translation table entry portion 34d provided for the cache block 42. If any address translation table header portion 34a has no connection to any of the address translation table entry portions 34b-34h via an entry and if any entry portion has not connected to another entry portion, a constant will be assigned instead of an address.

By configuring such table, a desired cache block copy 32 in the local memory 16 can be efficiently specified based on an address of a cache block 42 in the main memory 20. A common method for adding an entry to a hash table can be applied as the procedure for adding a new address translation table entry portion to the address translation table 34.

Figure 7:
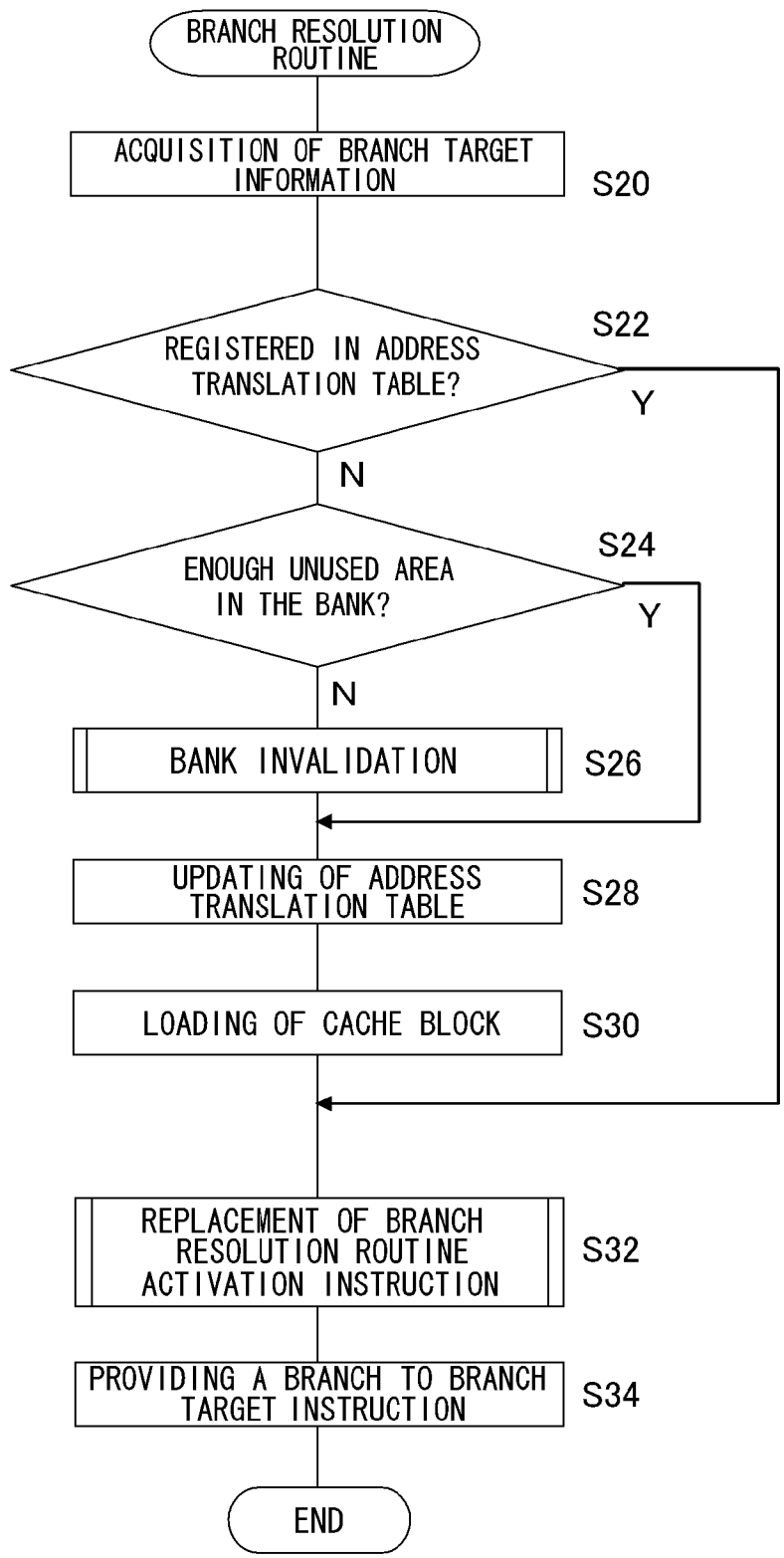
FIG. 7 is a flowchart that shows the procedure of a branch resolution routine in the embodiment.

Next, a branch resolution routine will be described that uses the apparatus and data structures described above. FIG. 7 is a flowchart that shows the procedure of a branch resolution routine. The description will be made on the assumption that a user has instructed the information processing apparatus 10 to activate software via the input/output apparatus 24, or the like. Cache blocks 42 corresponding to the software have been loaded into the main memory 20, at least one of the cache blocks 42 has been loaded into the local memory 16, and the processor 14 has been performing processing with reference to at least one of the cache blocks.

When the process advances to an instruction for calling a branch resolution routine for a cache block copy 32, and the branch resolution routine is called accordingly, the processor 14, in which is the branch resolution routine execution unit 110, refers to the corresponding entry in the branch target table 64 based on the address that has been stored in the register 18 through the preceding instruction sequence, and acquires the start address of the cache block 42 of the branch target in the main memory 20, the size of the cache block, the offset value of the branch target instruction, and the type of the branch (S20). The processor 14 then refers to the address translation table 34 to check if the table contains an entry matching the address in the main memory 20 (S22). If the table does not contain such entry (N at S22), the processor 14 will determine that a cache block copy 32 is not included in the local memory 16 and will initiate the loading.

More specifically, the processor 14 first checks if there is enough unused space in the bank in which the latest cache block copy 32, has been loaded, the first bank 30a for example, in order to store both a cache block copy 32 of a new cache block and an address translation table entry portion therefor, the address translation table entry portion 34b, for example (S24). In such a case, if the subsequent bank, e.g., the second bank 30b, was not yet used, it is determined that there is enough free space. If there is not enough space (N at S24), i.e., if a cache block copy 32 that is stored in the next bank, e.g., the second bank 30b, needs be discarded to store a cache block copy 32 of the new cache block, invalidation of the second bank 30b will be performed (S26). The invalidation process will be described later.

When the space for storing a cache block copy 32 of the new cache block is ensured (Y at S24 or S26), an entry will be added to the address translation table 34 by creating and writing the address translation table entry portion 34b in the start of the space and by updating the address translation table header portion 34a (S28). Then, based on the address in the main memory 20 acquired in S20, the cache block 42 is loaded from the main memory 20 into the ensured space in the local memory 16 (S30).

Thereafter, the instruction sequence that has called the branch resolution routine in the cache block copy containing the branch source, which had been originally processed, is replaced with a branch instruction that provides a branch to the corresponding instruction in the cache block copy 32 of the cache block that has been newly loaded (S32). The address of the instruction sequence of the branch target in the local memory 16 ("Y'", in FIG. 5) is obtained by adding the offset value of the instruction sequence acquired in S20 to the starting local address of the cache block copy 32 of the loaded cache block ("X'" in FIG. 5). The process then branches to the branch target instruction in the cache block copy 32 (S34).

If the address translation table 34 contains the corresponding entry in S22 (Y at S22), it means that a cache block copy 32 to which the branch was directed or targeted already exists within the local memory 16. Accordingly, the local address of the address translation table entry portion 34b is acquired from the address translation table 34 to perform the processes of S32 and S34. In a branch resolution routine, a cache block copy 32 containing a branch target could exist in the local memory 16 if the cache block copy 32 has been stored in the local memory 16 from a previous branch resolution routine caused by another instruction sequence.

Figure 8:
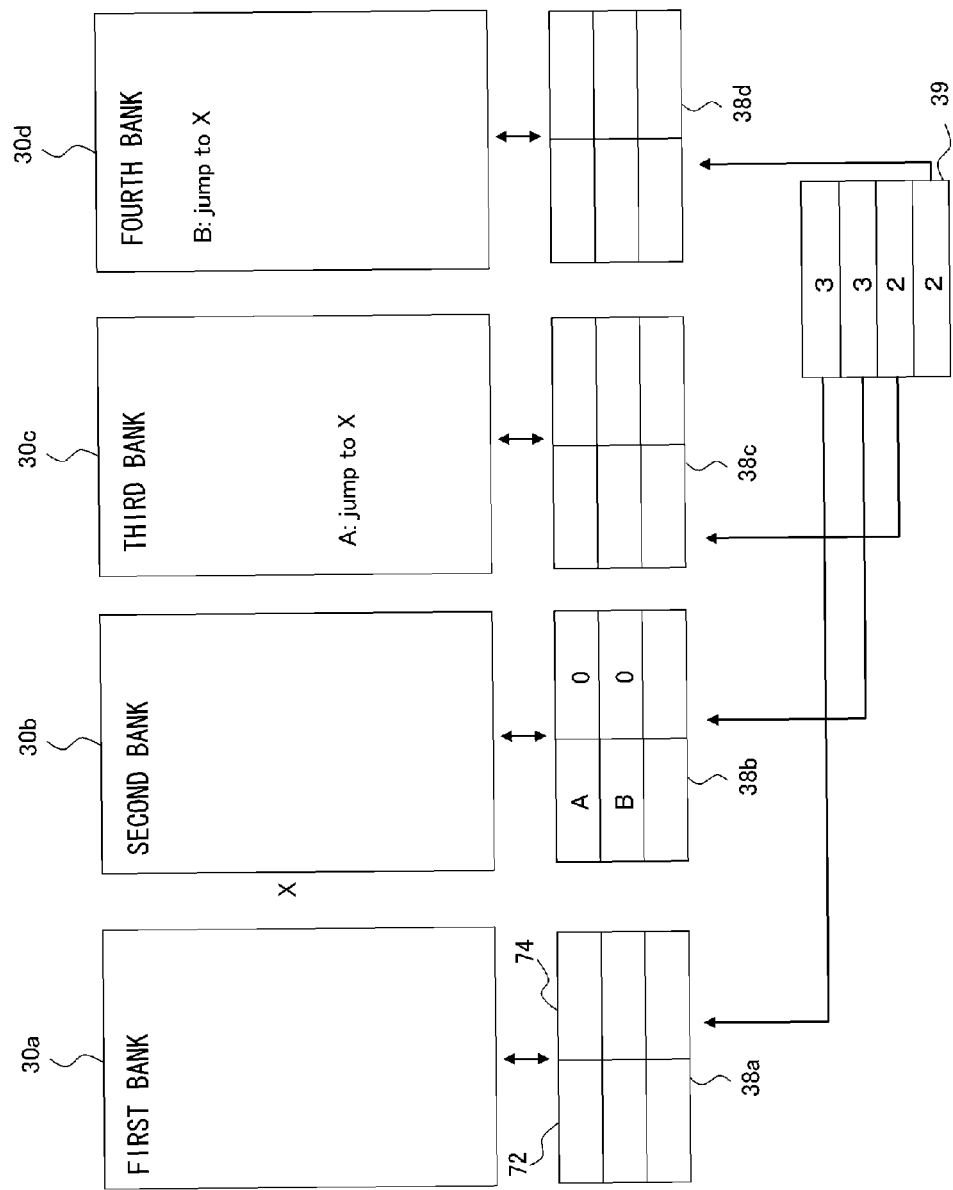
FIG. 8 is a diagram that schematically shows the relationships between a first bank, a second bank, a third bank, a fourth bank, inter-bank reference tables, and a generation number table in the embodiment.

In the following, there will be described a method for managing the first through nth banks 30a-30n that store cache block copy 32 in the local memory 16. FIG. 8 schematically shows the relationships between the first bank through fourth bank 30a-30d, inter-bank reference tables 38a-38d related to the respective banks, and the generation number table 39. Arrows illustrated in FIG. 8 show the corresponding relationships between the aforementioned elements.

As stated previously, cache blocks 42 containing branch targets are loaded into the local memory 16, one after another, during the execution of a program in the present embodiment. Accordingly, if the amount of code necessary for the execution of the program exceeds the capacity of the local memory 16, more specifically the space available for storing cache block copy 32, there will be eventually a need to discard cache block copies 32 of cash blocks already loaded so as to reuse the area as the storage area for to store cache block copies 32 of new cache blocks.

There is a problem, however, that branch instructions providing branches to discarded cache block copies 32 may be ubiquitous in all the cache block copies 32 in the local memory 16. Therefore the addresses of the branch targets in the local memory 16 included in such branch instructions are made invalid when the cache block copies 32 containing the branch targets are discarded. Accordingly, the branch instructions in such cache block copies 32 that contain branch sources, which have been provided in S32 as seen in FIG. 7, need be replaced again with original branch resolution routine activation instructions. To perform such efficient processing, the area for storing cache block copies 32 is divided into n banks, i.e., the first through nth banks 30a-30n, so as to manage the integrity of the cache block copies 32 in units of banks. Each of the inter-bank reference tables 38a, 38b, 38c and 38d are used, when the corresponding bank is invalidated, to specify the address of a branch instruction that is to be replaced by a branch resolution routine activation instruction in a cache block copy 32 containing a branch source.

Although FIG. 8 shows only the first through fourth banks 30a-30d, the same configuration can be employed also in the case where the number of the banks is greater than or less than four. Each of the inter-bank reference tables 38a-38d comprises entries, each of which includes a branch instruction address field 72 and a generation number low-order bit field 74. A branch instruction address field 72 contains the local address of an instruction sequence, which includes an instruction providing a branch to a cache block copy 32 stored in the corresponding bank, included in a cache block copy 32 containing the branch source that is located in a bank different than the corresponding bank. The instruction sequence described at that local address should be replaced with a branch resolution routine when the corresponding bank is invalidated.

A generation number low-order bit field 74 contains the least significant bit of the generation number of a bank that stores a cache block copy 32 containing an instruction sequence including a branch instruction. The generation number stored here is a generation number of a bank of a branch source at the time when the corresponding entry is registered in the inter-bank reference tables 38a-38d. Hereinafter, this generation number is called "generation number of an entry". When a branch resolution routine is activated in a cache block copy 32 and the corresponding instruction is replaced with a branch instruction providing a branch to a cache block copy 32 stored in the bank corresponding to the table, an entry is additionally registered in the inter-bank reference tables 38a-38d through the branch resolution routine.

If a cache block copy 32 containing the branch source and a cache block copy 32 containing the branch target are included in the same bank, the address of the branch source need not be added to the inter-bank reference tables 38a-38d since said cache block copies will be invalidated at the same time. Accordingly, only when a cache block copy 32 containing the branch target exists in a different bank, additional registration is made in the inter-bank reference table for the bank, among the tables 38a-38d, through the branch resolution routine activated in the branch source.

The generation number table 39 includes a field corresponding to each of the first through fourth banks 30a-30d, which contains the current generation number of the corresponding bank. The generation number is incremented by one each time the corresponding bank is invalidated. In the example of FIG. 8, the generation numbers of the first bank 30a and second bank 30b are "3", and those of the third bank 30c and fourth bank 30d are "2". When branch instructions providing branches to the address "X" in the second bank 30b are described at a local address "A" in the third bank 30c and a local address "B" in the fourth bank 30d, as also shown in FIG. 8, branch instruction address fields 72 of the inter-bank reference table 38b provided for the second bank 30b contain "A" and "B", while generation number low-order bit fields 74 of the table contain "0" as the least significant bit of "2", which is the generation number of the third bank 30c containing the local address "A" and is also the generation number of the fourth bank 30d containing the local address "B".

Each entry stored in the inter-bank reference tables 38a-38d is used when the corresponding bank among the first through fourth banks 30a-30d is invalidated and a branch instruction in a cache block copy 32 containing a branch source is replaced with a branch resolution routine activation instruction accordingly. However, if the bank storing the cache block copy 32 containing the branch source has been already invalidated before invalidating the subject bank, the entry itself is incorrect, i.e., is invalid. Accordingly, to determine the integrity of each entry stored in the inter-bank reference tables 38a-38d, the generation number low-order bit fields 74 are used.

When the generation number of an entry in the inter-bank reference tables 38a-38d is equal to the current generation number of a bank that includes or has included the branch instruction corresponding to the entry, the entry is valid; when they are not equal, it means that a cache block copy 32 including the branch instruction has been discarded, and hence, the entry is invalid. In the present embodiment, a generation number of an entry is compared with a current generation number using the least significant bits of the numbers, as will be described later.

Figure 9:
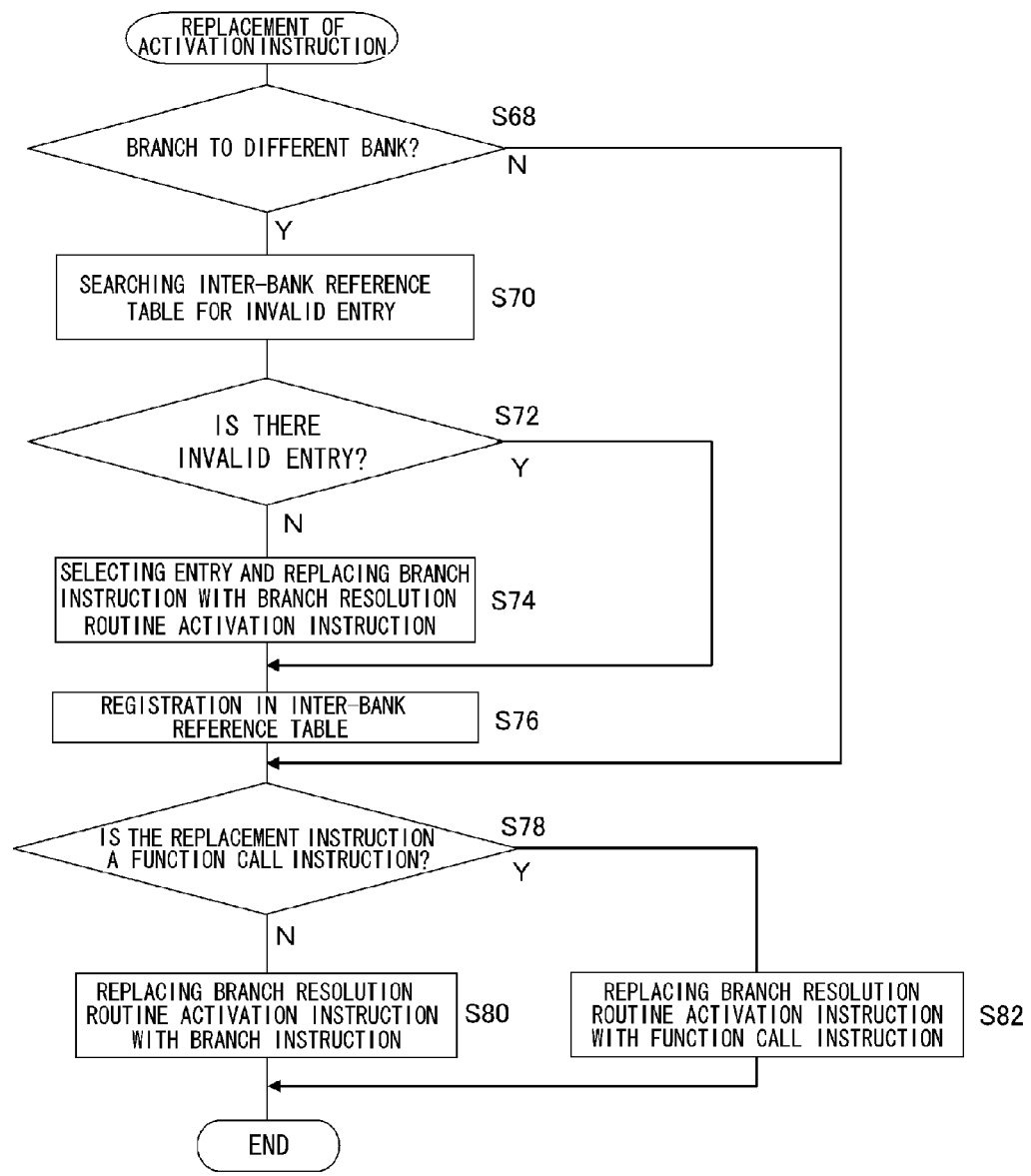
FIG. 9 is a flowchart that shows the procedure for the replacement of a branch resolution routine activation instruction in the embodiment.

Next, the procedure for the replacement of a branch resolution routine activation instruction, as shown as S32 in FIG. 7, will be described wherein the procedure includes additional registration of an entry in the inter-bank reference tables 38a-38d. FIG. 9 is a flowchart that shows the procedure for the replacement of a branch resolution routine activation instruction. First, if a branch to a different bank is provided, such as when a cache block copy 32 containing a branch target is newly stored in a different bank (Y at S68), an invalid entry will be sought in the corresponding inter-bank reference table 38 of the bank (hereinafter referred to as "branch target bank"), e.g., in the inter-bank reference table 38b when the branch target bank is the second bank 30b in FIG. 8 (S70). If there is an invalid entry, such entry is overwritten to add a new entry. If the cache block copy 32 containing the branch target is included in the same bank (N at S68), the processing of S70-S76 will not be performed, as updating of inter-bank reference tables is unnecessary.

The integrity of an entry is basically determined by comparing the generation number of the entry with the current generation number of a bank that includes a branch instruction for the entry, as mentioned previously. For the determination of integrity, in the present embodiment, the least significant bit of the generation number of each entry is used, which is stored in a generation number low-order bit field 74 of an inter-bank reference table 38, and the bank number, provided as the first through nth, of a bank that includes a branch instruction for the entry (hereinafter referred to as "branch source bank") is also used. A bank number can be computed from the local address of a branch instruction stored in the branch instruction address field 72 of each entry. Once you have discarded the data block, you can refer to it before it is loaded into local memory Posterior after exists in local memory Before it exists in local memory A bank that has stored a cache block copy 32 most recently is now defined as a reference bank. Since a bank's generation number is incremented by one when the bank is invalidated, the reference bank is a bank whose generation number has been incremented most recently among the first through nth banks 30a-30n. If the values in the generation number table 39 in FIG. 8 are considered, for example, the second bank 30b will be the reference bank. In such case, the first bank 30a, which precedes the second bank 30b and has a smaller bank ordinal number than the second bank 30b defined as the reference bank, has a generation number identical with that of the second bank 30b; the third bank 30c or fourth bank 30d, which follows the second bank 30b and has a greater bank ordinal number than the second bank 30b, has a generation number smaller by one than that of the second bank 30b defined as the reference bank.

With such characteristics, if the bank number of a branch source bank provided in an entry of an inter-bank reference table 38 is smaller than the bank ordinal number of the reference bank, the current generation number of the branch source bank is identical with that of the reference bank. In such case, it is determined that an entry that stores in its generation number low-order bit field 74 a value identical with the least significant bit of the generation number of the reference bank is valid, while an entry that stores in its generation number low-order bit field 74 a value not identical with the least significant bit of the generation number of the reference bank is invalid. On the other hand, if the bank ordinal number of the branch source bank is greater than that of the reference bank, the current generation number of the branch source bank is smaller by one than that of the reference bank. In such case, it is determined that an entry that stores in its generation number low-order bit field 74 a value not identical with the least significant bit of the generation number of the reference bank is valid, while an entry that stores in its generation number low-order bit field 74 a value identical with the least significant bit of the generation number of the reference bank is invalid.

Such determination process is repeated for each entry until an invalid entry is detected. Consequently, the generation number of an entry can be compared with the current generation number of a bank corresponding to the entry without searching the generation number table 39, by using only the least significant bit of the generation number of the reference bank and that of the generation number of the entry. Also, the current generation number of a bank corresponding to each entry may be sought in the generation number table 39 so as to be directly compared with a value stored in a generation number low-order bit field 74. By starting a search in the same inter-bank reference table 38b from an entry next to the invalid entry detected the last time, the search process can be made more efficient.

If an invalid entry is detected (Y at S72), the branch instruction address field 72 of the entry will be overwritten with the address at which the branch resolution routine activation instruction currently executed is described, and the generation number low-order bit field 74 of the entry will be overwritten with the current generation number of the bank that stores the cache block copy 32 including the branch resolution routine activation instruction, so that the entry will be newly registered in the inter-bank reference table 38 (S76). If no invalid entry is detected (N at S72), priority will be given to the entry to be added, so that one of the entries already registered will be selected and overwritten therewith. Prior thereto, the branch instruction described at the address stored in the branch instruction address field 72 of the selected entry is replaced with a branch resolution routine activation instruction (S74). Then, the new entry is registered in the inter-bank reference table 38 (S76).

Next, based on the identification information regarding the type of the branch stored in the branch type field 58 of the branch target table 64, which is acquired in S20 of FIG. 7, it is determined whether the instruction to be provided as a replacement is a branch instruction or a function call instruction (S78). If it is a branch-type instruction (N at S78), the branch resolution routine activation instruction will be replaced with the simple branch instruction (S80); if it is a function call-type instruction (Y at S78), the branch resolution routine activation instruction will be replaced with the function call instruction (S82). A function call instruction will be described later. Thus, when a cache block copy 32 is newly stored in a bank, such as the second bank 30b, additional registration can be made in the inter-bank reference table 38b or the like and a branch instruction to the cache block copy 32 can be provided as a replacement through the process stated above.

A function call is different from a simple branch since it requires the return to the original program. When a branch resolution routine is replaced with a function call instruction in S82 of FIG. 9, the branch process for providing a branch to the branch target instruction as shown in S34 of FIG. 7 requires, prior to the branch, processing for storing the following data in the register 18: the start address in the main memory 20 for the cache block 42 of the source of the call, which contains an instruction sequence to which the process returns from the function; the size of the cache block 42; and the offset value from the start address to the address at which the instruction of the return destination is described. Accordingly, a function call instruction provided as a replacement in S82 of FIG. 9 also includes an instruction for executing such process. The values to be stored in the register 18, as set forth above, can be acquired with reference to the branch target table 64 for the cache block copy 32.

With regard to a branch for returning the process from a called function, on the other hand, the source of the function call is not necessarily unique. Therefore, it is unable to provide, as a replacement, a branch instruction in which the address of the branch target in the local memory is specified, as described so far. Accordingly, with respect to each branch for returning the process from a function, the address of a cache block 42 to which the process returns in the local memory 16 may be acquired by searching the address translation table 34 based on the address of such cache block in the main memory 20, which is stored in the register 18. In the present embodiment, however, a link stack is used so as to improve the processing efficiency. A link stack is a stack to be referred to when a function is called and the process is then returned from a cache block copy 32 of the branch target to a local address in a cache block copy 32 of the source of the call.

Also, there is a case in the present embodiment where a cache block copy 32 including an instruction sequence of the return destination is discarded or re-loaded into another area while processing at the branch target is performed. Such case can be recognized when the process returns, by invalidating the corresponding address stored in the link stack.

Figure 10:
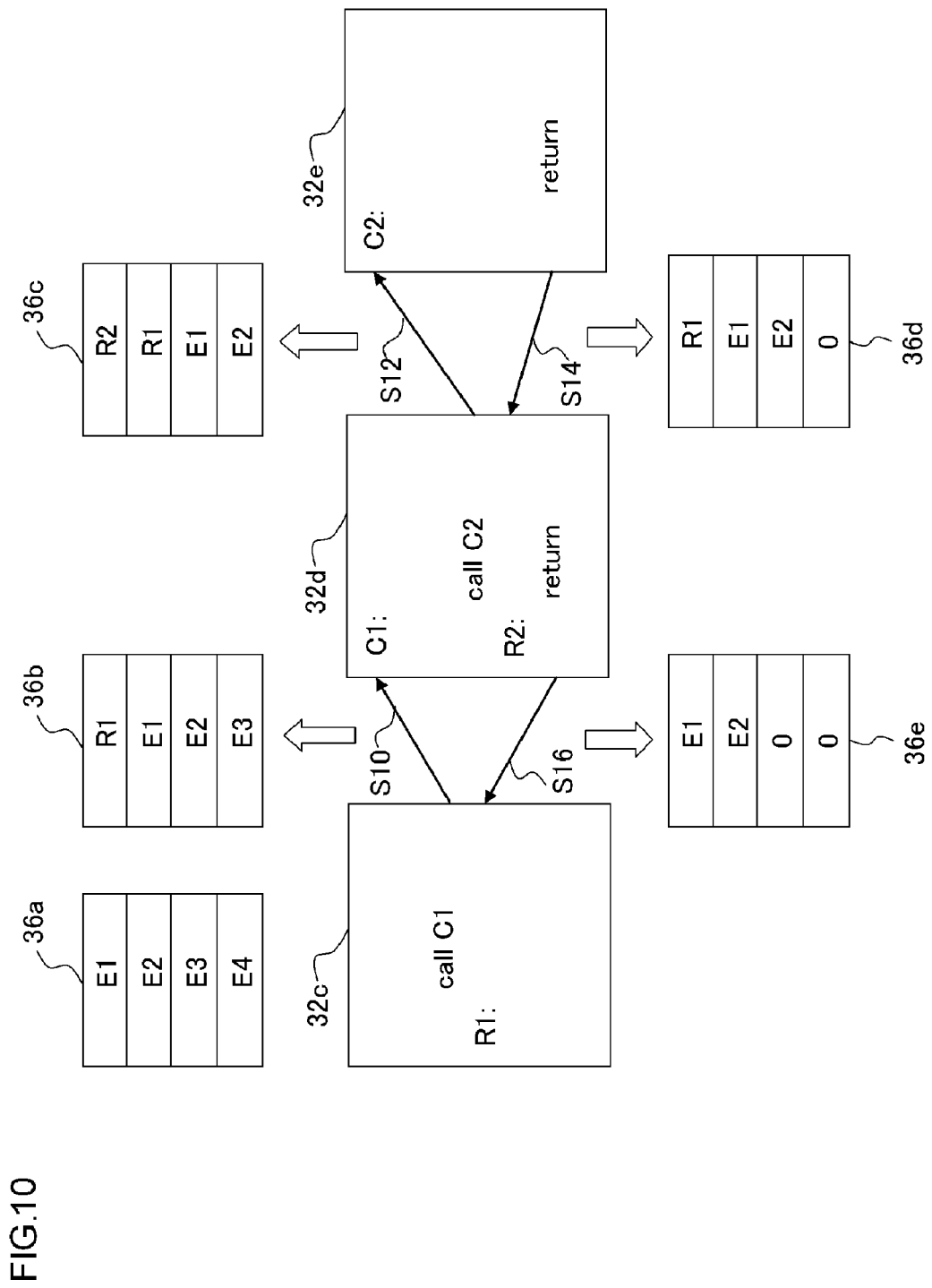
FIG. 10 is a diagram that schematically shows the states of a link stack during function calls and return processes in the embodiment.

FIG. 10 schematically shows the states of a link stack during function calls and return processes. Link stacks 36a-36e show the time-series variation of a single link stack stored in the register 18. Cache block copies 32c-32e of cache blocks are to be serially processed according to function calls, in which the cache block copy 32c calls the cache block copy 32d, and the cache block copy 32d then calls the cache block copy 32e. A link stack may be created for each thread processed by the information processing apparatus 10, but here is shown only a single link stack.

It is assumed here that the link stack 36a is in the initial state. The link stack 36a stores addresses "E4", "E3", "E2" and "E1" of return destinations in cache block copies 32 (not illustrated) in this order. When the processing in the cache block copy 32c is performed in this state and the process is then caused to branch to an address "C1" in the cache block copy 32d by an instruction "call C1" (S10), an address "R1" in the cache block copy 32c to which the process will return is added to the link stack 36a (link stack 36b). Subsequently, the processing in the cache block copy 32d is performed and when the process is caused to branch to an address "C2" in the cache block copy 32e by an instruction "call C2" (S12), an address "R2" in the cache block copy 32*d* to which the process will return is added to the link stack 36*b* (link stack 36*c*).

Then, the processing in the cache block copy 32*e* is performed and when the process returns to the cache block copy 32*d* according to an instruction "return" (S14), the link stack 36*c* is referred to, so that the return destination address "R2" can be found in the top entry therein. Consequently, the link stack becomes the state shown as the link stack 36*d*. Thereafter, the processing in the cache block copy 32*d* is performed and when the process returns to the cache block copy 32*c* according to an instruction "return" (S16), the link stack 36*d* is referred to, so that the return destination address "R1" can be found in the top entry therein. As shown in FIG. 10, when the link stacks 36*a*-36*e* lack storage capacity, the oldest entry is deleted.

If the link stacks 36*a*-36*e* include an address in a cache block copy 32 that is discarded during branch processing, such address will be replaced with an invalid address. The invalid address here is an arbitrary value at which no instruction can be placed. While the cache block copy 32*e* is executed, for example, if the cache block copy 32*d* of the return destination is discarded, the "R2" in the top entry of the link stack 36*c* will be replaced with "0" or the like. Thus, it can be recognized that the cache block copy 32 containing the return destination address has been discarded.

When a cache block copy 32 of a return destination is discarded, a branch resolution routine is activated so as to re-load such cache block from the main memory 20 based on the information that has been stored in the register 18 before the function call. Also, instead of an invalid address, the address in the main memory 20 or local memory 16 at which the branch resolution routine is stored may be assigned in the link stack. Accordingly, the process is caused to branch to such address, thereby activating the branch resolution routine directly. Thus, the process for determining the discard of a cache block copy 32 based on whether or not the corresponding address is invalid can be omitted.

Figure 11:
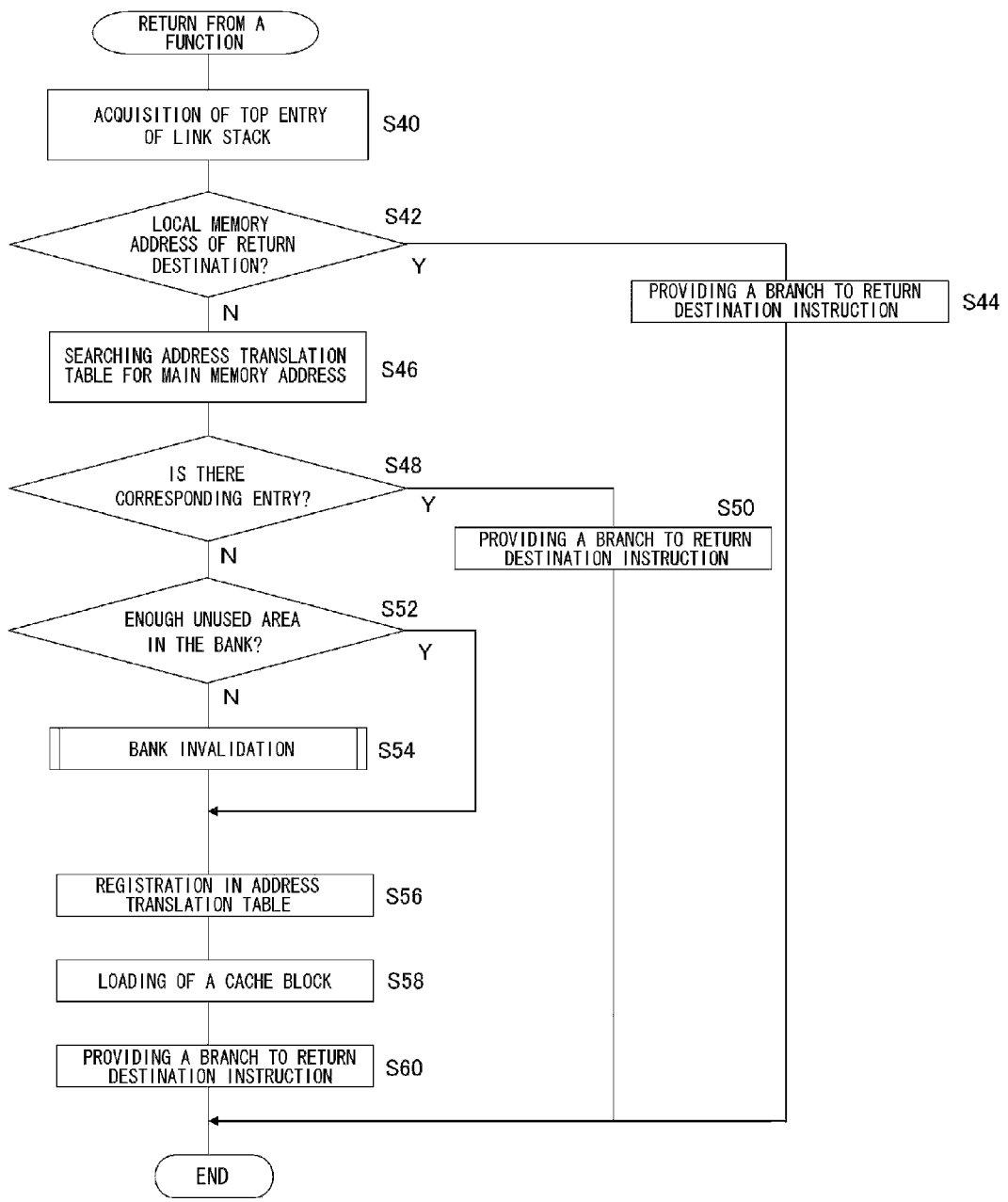
FIG. 11 is a flowchart that shows the procedure for returning the process from a called function in function call processing in the embodiment.

FIG. 11 is a flowchart that shows the procedure for returning the process from a called function using the link stacks 36*a*-36*e* as mentioned previously. First, the top entry of, for example, the link stack 36*c* is acquired, as shown in FIG. 10 (S40). Then, it is determined if the top entry thus acquired is included within an address range where the corresponding cache block copy 32 is stored in the local memory 16 (S42). If the entry is included within the address range (Y at S42), it will be determined that the cache block copy 32 containing the instruction sequence of the return destination has not been discarded, so that the process will be caused to branch to the return destination instruction described at the acquired address (S44).

If the top entry is "0" or another address that is not included within the address range (N at S42), whether or not the corresponding cache block copy 32 is included in the local memory 16 will be first checked by searching the address translation table 34 based on the address of the cache block in the main memory 20 stored in the register 18 (S46). It is because, even if the entry is not included within the address range, there is a case where the cache block copy 32 once discarded has been re-loaded, or a case where the entry has been deleted due to a shortage in the capacity of the link stack but the cache block copy 32 itself still exists. Accordingly, if the corresponding entry is found in the address translation table 34 (Y at S48), the address of the corresponding cache block copy 32 in the local memory 16 is acquired from the table, so as to provide a branch to the return destination instruction based on the offset value stored in the register 18 (S50).

If the corresponding entry is not found in the address translation table 34 (N at S48), it will be determined that the cache block copy 32 has been discarded and has not been re-loaded yet, so that the loading process will be initiated. More specifically, as with S24, S26, S28, S30 and S34 in FIG. 7, the capacity of an unused area in a bank is checked (S52), a bank is invalidated if necessary (S54), registration is made in the address translation table 34 (S56), the cache block 42 is loaded (S58), and a branch is provided to the return destination instruction (S60). Accordingly, even if a cache block copy 32 including a return destination instruction has been once discarded, the loading process can be performed only when necessary after an efficient search.

Figure 12:
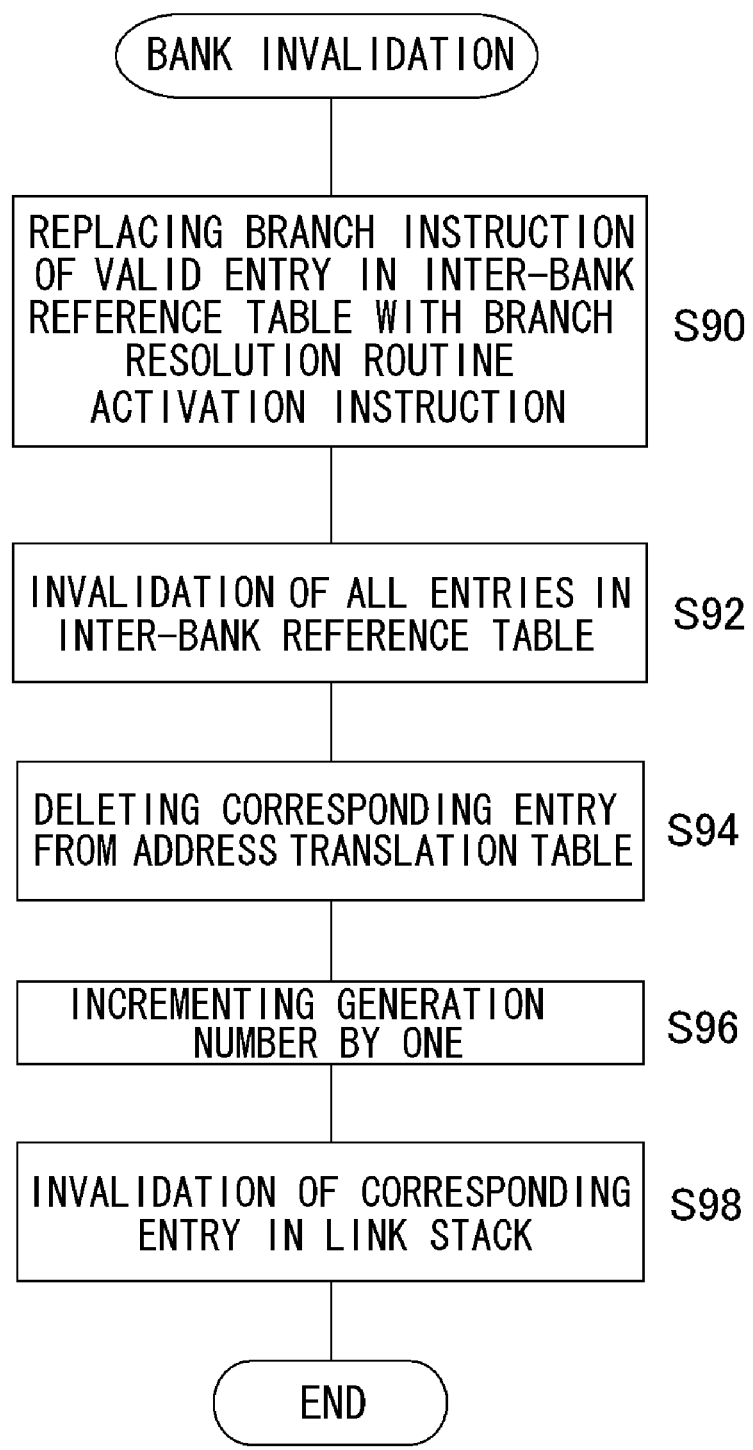
FIG. 12 is a flowchart that shows the procedure of bank invalidation processing in the embodiment.

FIG. 12 is a flowchart that shows the procedure for invalidating a bank, and the second bank 30*b* is considered here as an example. First, a valid entry is extracted from the inter-bank reference table 38*b* provided for the second bank 30*b*, which is to be invalidated, and a branch instruction described at the address stored in the branch instruction address field 72 of the entry is replaced with a branch resolution routine activation instruction (S90). The integrity of an entry can be determined using the same logic as described with reference to FIG. 9. Then, an arbitrary address in the second bank 30*b* and the least significant bit of a generation number are provided in the branch instruction address field 72 and generation number low-order bit field 74, respectively, of each entry in the inter-bank reference table 38*b*, so as to invalidate all the entries (S92).

Thereafter, based on the connections between entries in the address translation table 34 provided according to the order in which the entries have been loaded, as indicated in FIG. 6 by the dotted-line arrow 74, an entry corresponding to a cache block copy 32 in the second bank 30*b* to be invalidated is deleted (S94). More specifically, when an entry retains a pointer to the entry to be deleted, such pointer is replaced with a constant other than an address. Then, the generation number in a field corresponding to the second bank 30*b* in the generation number table 39 is incremented by one (S96). Lastly, if the link stacks 36*a*-36*e* contain an address in the second bank 30*b* to be invalidated, such address will be replaced with "0" or the like so as to be invalidated, as stated previously (S98). Thus, invalidation of the second bank 30*b* can be reflected in a branch resolution routine though the process above.

According to the present embodiment set forth above, a program is divided into cache blocks, which are units by which a program is loaded into the local memory, and the processor refers to a cache block stored in the local memory to perform processing. Therefore, the processor can refer to a program more quickly than in the case where it accesses a program stored in the main memory, thus reducing the overall processing time.

The division of a program is automatically performed by the compiler based on the size or frequency of use. During compiling, a branch resolution routine activation instruction is also embedded to execute a branch between cache blocks within the local memory. When the branch resolution routine is activated while the program is executed, a cache block is loaded from the main memory, if necessary, and a branch instruction with an address in the local memory is created and written into the cache block. These processes are performed by the compiler, so that the programmer need not divide a program into modules or prepare a program for loading each module into the local memory. Accordingly, fast access to a program can be achieved with less work.

In addition, the discard of cache blocks is managed for each bank in the present embodiment. When a bank is invalidated to load a new cache block, the corresponding inter-bank reference table is used to find all branch instructions providing branches to cache blocks stored in the bank to be invalidated, and to identify the positions of such branch instructions in the cache blocks of the branch sources. Thereafter, the branch instructions are replaced again with branch resolution routine activation instructions. Unlike a common cache memory in which no correlation is found between data stored in cache lines, cache blocks stored in the local memory in the present embodiment have complicated positional correlation. Therefore, discarding a cache block once loaded means destroying the positional relationships established in the local memory, thereby affecting the programs of cache blocks processed anterior or posterior to the discarded cache block. Such complicated condition can be efficiently controlled by managing cache blocks for each bank in terms of generation numbers.

Also, a cache block is certainly provided with a branch target table; when the cache block includes branch processing, the branch target table contains information on a cache block of the branch target, more specifically the address at which the cache block of the branch target is stored in the main memory. In addition, since the address translation table, which shows the relationship between an address in the main memory and an address of a copy in the local memory, is provided within the local memory, the storage area of a cache block or whether or not a copy of the cache block exists in the local memory can be identified at any time by using the address of the cache block in the main memory as identification information. If the address translation table is structured as a hash table, more efficient search will be achieved. In addition, such hash table structure enables easy tracing of the order in which cache blocks have been loaded into the local memory, so that an entry for a cache block that is stored in an invalidated bank can be deleted efficiently.

When the process returns from a function to the original process in function call processing, a stack is used instead of performing the process for replacing a branch resolution routine with a branch instruction. Accordingly, even in function call processing in which the return destination cannot be fixed, a program is automatically divided and cache blocks are loaded into the local memory in the same way as in other branch processing, and hence, the same effects can be achieved as stated above.

The present invention has been described with reference to the embodiment. The embodiment above is intended to be illustrative only and it will be obvious to those skilled in the art that various modifications to constituting elements or processes could be developed and that such modifications also fall within the scope of the present invention.

For example, although the present embodiment describes a mode in which cache blocks obtained by dividing a program are loaded from the main memory into the local memory, they may not necessarily be programs as long as they are reference data having positional or dependence relationships between each other, such as segments of a series of data stream or pieces of frame data of a moving image that has been coded using inter-frame prediction.

What is claimed is:

1. An information processing apparatus comprising:
   a main memory, which stores a program compiled by a compiler, the program being divided into pre-compiled units of program blocks that may refer to each other in an instruction sequence of the program;
   a local memory including 1 to n memory banks, where n is a natural number, each memory bank being a fixed allocated area having sufficient memory space to cache at least one program block, wherein a memory bank i is selected as a current memory bank for caching;
   a processor, which processes the instruction sequence of the program by sequentially referring to one or more cached program blocks containing the division of the program as required during the flow of the instruction sequence,
   wherein, when the instruction sequence references a program block that has not been cached in a memory bank, the processor caches the referenced program block into the current memory bank if there is sufficient memory space available, and, if there is insufficient memory space available, the processor selects a memory bank (i+1) mod n as the current memory bank, deletes all previously-cached program blocks within, and caches the referenced program block into the current memory bank, and
   wherein the processor stores reference destination information, including bank identification information and local memory address information, of a cached program block at the current memory bank so as to be referenced during the instruction sequence.

2. The information processing apparatus according to claim 1, wherein:
   the processor further stores reference source information of each of the memory banks, including information regarding whether a cached program block in each memory bank is being referenced by a cached program block in another memory bank, and
   when the processor deletes all previously-cached program blocks from the current memory bank, the processor performs a process to invalidate the source reference information of the current memory bank.

3. The information processing apparatus according to claim 2,
   wherein the processor further stores in a bank generation number table a bank generation number, respectively, for each memory bank,
   wherein when a memory bank is selected as the current memory bank, the bank generation number for the current memory bank is incremented, and
   wherein, when the reference source information is updated for a memory bank, the respective bank generation number is included in the update.

4. The information processing apparatus according to claim 3, wherein:
   for each respective memory bank, only the least significant bit of the bank generation number is that which is included in the reference source information, and
   wherein, when the processor references a program block cached in a memory bank, the processor ensures that the bank generation number of the memory bank indicated in the bank generation number table corresponds to the generation number included in the reference source information of the one memory bank by comparing the least significant bits of both the bank generation number indicated in the bank generation number table and the bank generation number included in the reference source information.

5. The information processing apparatus according to claim 1,
   wherein the processor stores a hash table in local memory in which the local memory address of each cached program block is related to an address of the respective program block in the main memory, and wherein the processor uses the hash table to trace an order in which program blocks have been cached in a respective memory bank in the local memory.

6. An information processing apparatus comprising:

a main memory, which stores a software program compiled by a compiler, the program being divided into pre-compiled units of program blocks that may refer to each other in an instruction sequence of the program;

a local memory including 1 to n memory banks, where n is a natural number, each memory bank being a fixed allocated area having sufficient memory space to cache at least one program block, wherein a memory bank i is selected as a current memory bank for caching;

a processor, which processes the instruction sequence of the program by sequentially referring to one or more cached program blocks containing the division of the program as required during the flow of the instruction sequence, wherein, when the instruction sequence references a program block that has not been cached in a memory bank, the processor caches the referenced program block into the current memory bank if there is sufficient memory space available, and, if there is insufficient memory space available, the processor selects a memory bank (i+1) mod n as the current memory bank, deletes all previously-cached program blocks within, and caches the referenced program block into the current memory bank, and wherein the processor stores reference destination information, including bank identification information and local memory address information, of a cached program block at the current memory bank so as to be referenced during the instruction sequence, and wherein, in the newly-cached referenced program block, one or more branch instructions exist to provide a branch from the newly-cached referenced program block to a separately cached program block, and the processor stores reference destination information of the newly-cached referenced program block including the branches provided by the one or more branch instructions.

7. The information processing apparatus according to claim 6, wherein the processor writes the reference destination of the newly-cached referenced program block into the one or more branch instructions.

8. The information processing apparatus according to claim 6, wherein the processor stores an address translation table in local memory in which the local memory address of each cached program block is related to an address of its respective program block in the main memory, and wherein the processor uses the address translation table to acquire reference destination information for each cached program block.

* * * * *